Dec. 27, 1938.  H. A. D. BAER  2,141,849
STEERING WHEEL TABLE
Filed Aug. 5, 1937

Inventor
H. A. D. Baer

Patented Dec. 27, 1938

2,141,849

UNITED STATES PATENT OFFICE 2,141,849

STEERING WHEEL TABLE

Harry A. D. Baer, Allentown, Pa.

Application August 5, 1937, Serial No. 157,616

1 Claim. (Cl. 45—58)

The invention relates to a new and improved writing and utility table for the automobile driver and it aims to provide a convenient and serviceable table; a table on which the driver can write or make frequent notations with perfect comfort and ease; a table for the deliveryman who may have records, directions or other data in plain view at all times; a table for conveniently holding a road map or similar guide for easy observation while touring; a table which while useful in many ways, will not interfere with the driving or steering of the machine or blowing of the horn; a table in plain view at all times, so attached and located that it will not interfere with the comfort, entrance and exit of the driver; a table which is easily adjustable to any size of steering wheel or column, and a device of simple and inexpensive nature.

With the foregoing in view, the invention resides in the novel subject matter hereinafter described and claimed, description being accomplished by reference to the accompanying drawing.

Figure 1:
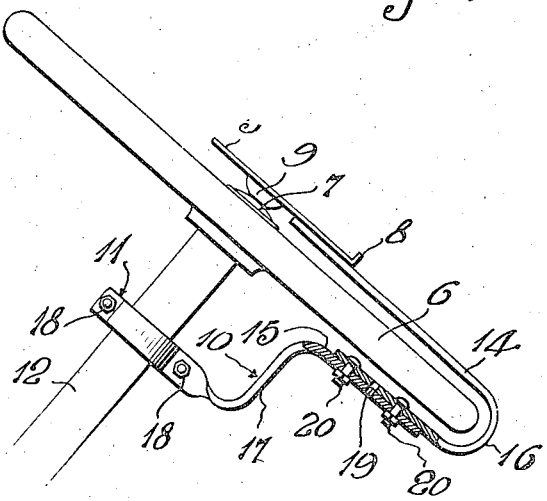
Fig. 1 is a side elevation partly broken away and in section showing the table and its attaching means operatively associated with a steering wheel, the horn button and the steering column.
Figure 2:
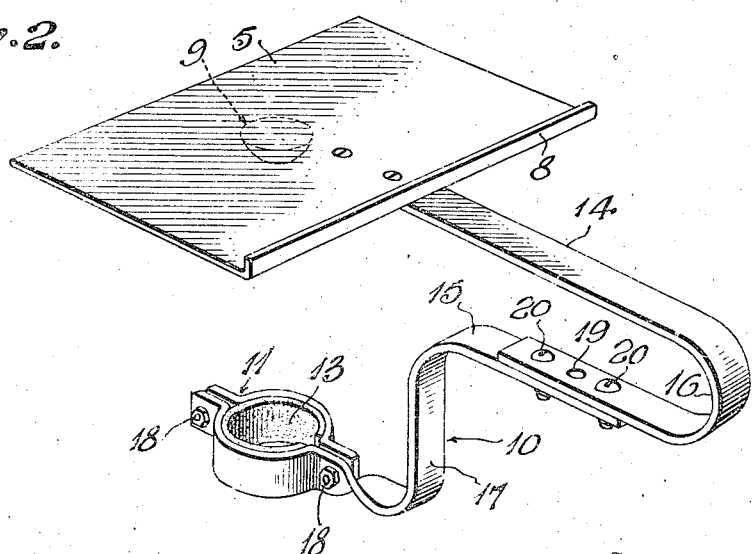
Fig. 2 is a perspective view showing the table and its attaching means detached from the wheel and column.

A preferred construction has been illustrated and will be rather specifically described, with the understanding however, that variations may be made within the scope of the invention as claimed.

I provide a sheet-support or table 5 to directly overlie a steering wheel 6 and its central horn button 7, said table or sheet-support being of insufficient size to interfere with grasping the rim of the wheel 6. Preferably a single piece of sheet metal is utilized in forming the table or sheet-support 5 and the lower edge of this piece of metal may be bent upwardly to provide a flange 8 to assist in properly holding papers and the like. Rubber bands (not shown) and suitable paper clips (not shown) may be used to effectively fasten the sheets to the support.

In the present showing, the lower side of the support 5 is provided with a rubber cushion 9 to rest lightly upon the horn button 7 and provision is made for rather rigidly, yet somewhat yieldably mounting said support, whereby it may be conveniently used not only as holding means for various kinds of papers, but may be readily depressed to depress the button 7 to sound the horn.

A carrying bracket 10 is provided for the support 5, said bracket having an internally padded clamp 11 to embrace the steering column 12, the padding 13 being of leather, rubber, felt or other appropriate material. The bracket 10 includes upper and lower arms 14 and 15 for disposition directly over and directly under the steering wheel 6, said arms being connected by a bight portion 16. The lower arm 15 is preferably downwardly offset toward its free end as denoted at 17 and said end is provided with the clamp 11. This clamp is of sectional construction, with its sections connected by bolts 18, adapting said clamp to steering columns of different sizes. Similarly the lower arm 15 is preferably formed from sections adjustably connected with each other, to permit adjustment of the bracket according to the size of the steering wheel. In the present disclosure, the arm sections are provided with a plurality of openings 19 through any of which bolts 20 may be passed.

From the foregoing, taken in connection with the accompanying drawing, it will be seen that novel and inexpensive provision has been made for carrying out the objects of the invention, and attention is again invited to the possibility of making variations within the scope of the invention as claimed. The device may be obviously constructed from any desired material or materials and may be finished in any appropriate manner to give an attractive appearance and to resist corrosion.

I claim:—

An attachment of the class described comprising a metal strip offset between its ends in the direction of its thickness providing it with upper and lower arm portions, the lower arm portion being given a quarter twist near its inner end, the portion of said lower arm between said twist and the free end of the arm being curved to provide a clamp member to lie against one side of a steering column, a second clamp member to lie against the opposite side of the steering column, and means for connecting said clamp members; a second metal strip bent in the direction of its thickness into U-shape providing it with upper and lower arms to straddle the rear portion of a steering wheel, said lower arm being shorter than said upper arm and being overlapped with said upper arm portion of the first mentioned strip, adjusting means connecting said lower arm with said upper arm portion and constructed to allow relative longitudinal adjustment thereof, and an article-supporting plate secured to said upper arm of said second strip to overlie the central portion of the steering wheel.

HARRY A. D. BAER.